April 16, 1940.   P. F. HATCH   2,197,364

WHEEL BALANCING UNIT

Filed June 9, 1939

PAUL F. HATCH
INVENTOR

BY Beaman & Langford
ATTORNEY.

Patented Apr. 16, 1940

2,197,364

UNITED STATES PATENT OFFICE 2,197,364

WHEEL BALANCING UNIT

Paul F. Hatch, Ypsilanti, Mich., assignor to Harley C. Loney Company, Detroit, Mich., a corporation of Michigan Application June 9, 1938, Serial No. 212,748

4 Claims. (Cl. 301—5)

The present invention relates to balance weights for attachment on the tire retaining flange of a vehicle wheel to balance the unbalanced force which would otherwise result in objectionable vibration of the wheel on rotation.

This invention comprises an improvement over my copending application, Serial No. 93,934, filed August 3, 1936, and is particularly directed to the construction of the spring securing clip and to an arrangement thereof to permit the riveting of the clip to the weight without interference by the lip portion of the clip. In my aforesaid copending application there is disclosed a type of wheel balancing unit wherein the securing clip is riveted to the side of the weight, which abuts against the under side of the wheel flange. It has been found for balancing weights of some designs that the lip or flange gripping portion of the clip overlaps the weight to such an extent as to interfere with the heading up of the rivet or other securing member. By providing a cut-out portion in the lip directly opposite the rivet or other securing member, interference by the lip portion in securing the clip to the weight is eliminated. This construction also provides a better flange gripping action by the lip of the clip.

An object of the invention is to provide a wheel balancing unit having a bifurcated attaching clip.

Another object of the invention is to provide a wheel balancing unit wherein the attaching clip has the lip portion thereof cut out centrally to permit the free access of a tool to the securing rivet or other attaching structure.

These and other objects will be apparent from the following specification when taken with the accompanying drawing, in which.

Figure 3:
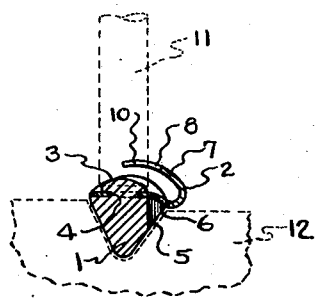
Fig. 3 is a section on the line III—III of Fig. 2, having added thereto the dotted outline of a heading up tool and a fixture for holding the balancing unit during the heading up operation.

Referring particularly to the drawing, the reference character 1 indicates the weight portion of the wheel balancing unit having an elastic clip 2 secured thereto, preferably by an integral rivet 3. The weight 1 and clip 2 broadly comprise the known type of balancing unit wherein the clip 2 elastically grips the edge of the usual wheel rim flange, the unit being positioned either singly or in pairs to balance the wheel and tire assembly. It will be observed that the clip 2 is disposed in a recess in the weight portion 1, the depth of the recess being slightly greater than the height of the rivet 3, as shown in Fig. 3. The rivet 3 is preferably a portion of the weight 1, which has been projected through an opening 4 in the clip and headed over to secure the clip 2 to the weight portion 1. The weight portion 1 is provided with a recess 5, and the clip 2 is provided with a hole 6 for receiving a tool for removing the weight from the wheel flange, to which it is secured in a manner disclosed in my aforesaid copending application.

Figure 1:
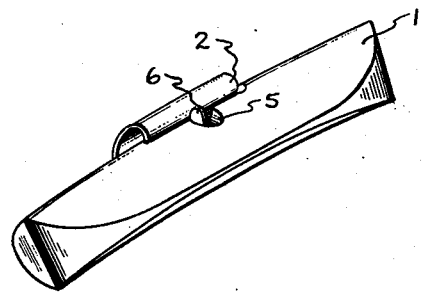
Fig. 1 is a perspective view of the wheel balancing unit.
Figure 2:
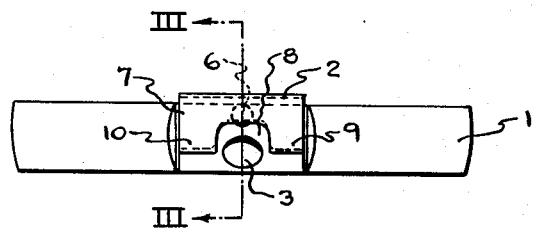
Fig. 2 is a front elevation disclosing the clip secured to the weight.

As disclosed particularly in Figs. 2 and 3, the clip 2 is provided with a lip 7 having a portion cut out to provide an opening 8 defining portions 9 and 10. It will be clear from Figs. 2 and 3 that the portions 9 and 10 are disposed on either side of the upsettable member 3 and that the opening 8 provides a passageway for the rivet set 11, as shown in dotted outline in Fig. 3.

As shown in Fig. 3, the weight 1 is disposed in a fixture 12, which may be any suitable device for holding the weight 1 while it is being worked on. The clip 2 is then disposed on a weight 1, with the upsettable portion thereof projecting through an opening 4 in the clip 2. The set 11 is then moved downwardly to head up the member 3 over the clip 4. It will be understood that instead of the integral upsettable member, other attaching means may be employed, such as an escutcheon pin, for instance.

In addition to providing free access to the upsettable member 3 without interference by the clip 11, the end portions 9 and 10 of the lip 7 also provide a better gripping contact with the surface of the wheel flange to which the balancing unit is clipped, since any irregularity in the clip or the wheel flange under one of the portions 9 or 10 will not have any effect on the gripping of the other of the portions 9 or 10. Also, in cases where the tire overlaps the lip on the wheel flange, the projection of the tire through the opening 8 will help to hold the unit against shifting.

The invention has been disclosed as applied to a specific form of wheel balancing unit. However, it is to be understood that it may be applied to other forms of wheel balancing units. It will also be evident that as the bifurcated lip has utility apart from the solving of the problem of riveting the clip 2 to the weight, it can be used independently of any specific attaching structure. It will be further evident that the bifurcated lip may be employed on balancing units where the unit is attached to the wheel and tire assembly only by the clamping of the lip against the wheel flange by the tire.

Having thus described my invention, what I desire to secure by Letters Patent and claim is:

1. For balancing a wheel having a tire carrying rim with an outwardly flaring flange, a unit comprising a clip for elastically engaging the flange, a weight carried by said clip, said clip having a first portion engaging said weight and a second portion spaced from and at least partially overlapping said first portion, said portions being adapted to receive the wheel flange therebetween, said first portion having an opening therein, and a headed member extending through said opening to secure said clip to said weight, said second clip portion including two lips spaced apart to provide a clear normal passage to said first clip portion to permit the access of a tool to said headed member without interference by said second clip portion and to improve the gripping of said second clip portion on the wheel flange.

2. For balancing a wheel having a tire carrying rim with an outwardly flaring flange, a unit comprising a clip for elastically engaging the flange, a weight carried by said clip, said clip having a first portion secured to said weight and a return bent second portion, said portions being adapted to receive and grip the wheel flange therebetween, said second portion comprising two spaced lips.

3. For balancing a wheel having a tire carrying rim with an outwardly flaring flange, a unit comprising a clip for elastically engaging the flange, and a weight carried by said clip, said clip being substantially U-shaped in cross-section and comprising two spaced portions for receiving and gripping the wheel flange therebetween, one of said portions having two spaced lips.

4. For balancing a wheel having a tire carrying rim with an outwardly flaring flange, a unit comprising a clip for elastically engaging the flange, a weight carried by said clip, said clip having a first portion engaging said weight and a second portion spaced from and at least partially overlapping said first portion, said portions being adapted to receive the wheel flange therebetween, said first portion having an opening therein, and a headed member extending through said opening to secure said clip to said weight, said second clip portion having a recess in the outer edge thereof to provide a clear normal passage to said first clip portion to permit the access of a tool to said headed member without interference of said second clip portion and to improve the gripping of said clip portion on the wheel flange.

PAUL F. HATCH.